Feb. 14, 1956  B. R. LEONARDI  2,734,435
FILTER

Filed Nov. 3, 1951  3 Sheets-Sheet 1

BENEDICT R. LEONARDI
INVENTOR.

BY Abraham Friedman
Atty.

INVENTOR.
BENEDICT R. LEONARDI

Feb. 14, 1956     B. R. LEONARDI     2,734,435
FILTER
Filed Nov. 3, 1951     3 Sheets-Sheet 3
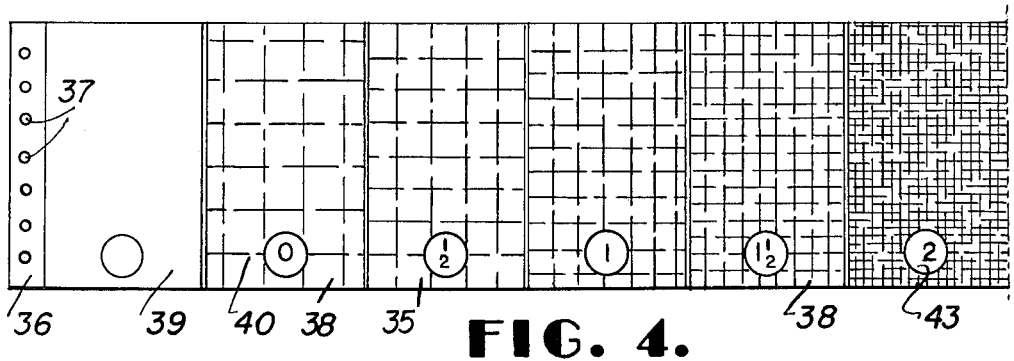
FIG. 4.
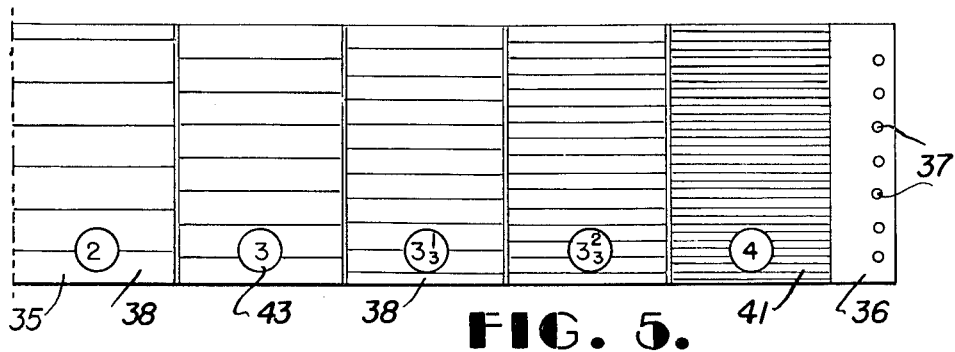
FIG. 5.
| FILTER NUMBER | CONTRAST GRADE |
|---|---|
| 1 F | 0 |
| 2 F | 1/2 |
| 3 F | 1 |
| 4 F | 1½ |
| 5 F | 2 |
| 6 F | 2½ |
| 7 F | 3 |
| 8 F | 3⅓ |
| 9 | 3⅔ |
| 10 | 4 |
FIG. 6.
BENEDICT R. LEONARDI
*INVENTOR.*
BY *Abraham Friedman*
              *Atty.*

United States Patent Office 2,734,435
Patented Feb. 14, 1956

2,734,435

FILTER

Benedict R. Leonardi, Brooklyn, N. Y.

Application November 3, 1951, Serial No. 254,700

1 Claim. (Cl. 95—73)

This invention relates to a filter arrangement for photographic printers, particularly adapted for use in the production of contact prints on variable contrast photographic printing papers.

In the production of contact prints from photographic negatives it is well recognized that the printing paper must in many instances compensate for the improper contrast value of the negative in order to produce a satisfactory picture. In order to provide this compensation for the variety of contrast grades encountered in negatives some varieties of photographic contact printing papers are produced in a number of contrast grades. Thus the short or hard papers are adapted to produce prints of greater contrast from the same negative than the long or soft papers. The correct rendition of the tones of the subject from a particular negative make it essential that the grade or contrast in the printing paper be suitable for the printing of the particular negative being printed. For this purpose certain photographic printing papers are produced in a number of contrast grades usually numerically designated from 0 to 5 ranging from low to high in contrast value. These graded papers are thus limited to specific contrast values and intermediate contrasts are not available to the user. In order to provide added flexibility in the range of contrast values obtainable in printing of negatives, variable contrast photographic printing papers are presently commercially available such as Varigam photographic paper. The contrast of the print obtained by use of these variable contrast papers is controlled by varying the color of the light to which the paper is exposed during the printing process. Thus, exposure to blue light produces a hard or high contrast print, sometimes referred to as a short print whereas exposure to yellow light will produce prints of soft or low contrast, which is similarly referred to as a long print. Intermediate values of contrast may be obtained using this type of paper by regulating the ratio of mixtures of yellow and blue light to which they are exposed. The exposure to blue or yellow light or the mixtures thereof in various ratios is obtained by passing the light from the source of illumination through blue or yellow filters, or filters which transmit mixtures of these colors. The range of contrast thus obtained is dependent entirely upon the selection and range of the filters utilized and only a single grade of paper is utilzed. Heretofore, the use of such variable contrast printing papers have been largely limited to projection printing or enlarging. In a printing process of this type, it has been found possible to position filter elements in front of the projection or enlarging lens and to substitute elements as required. This method of printing with variable contrast papers has often been found to be inconvenient and has therefore been a limiting factor in their use.

An object of this invention is to provide a simple, efficient and economical filter arrangement for the production of photographic prints of elected contrast grade on variable contrast photographic printing papers using contact printing methods.

It is a further object of this invention to provide a filter arrangement whereby prints of satisfactory contrast grade may more readily be produced on variable contrast photographic printing papers, in accordance with the contrast requirement of the particular negative printed.

A still further object of this invention is to provide a filter arrangement which makes possible the contact printing of variable contrast photographic printing papers and which will permit the production of a wide range of contrast values.

Another object of this invention is to provide a filter arrangement of the character indicated wherein the contrast values to be produced may be readily selected, changed or varied.

An additional object of this invention is to provide a filter arrangement of the character indicated wherein the filter elements may readily be changed during the printing operation by the movement of a filter web to produce a wide range of intermediate contrast values.

It is also the object of this invention to provide a simple and efficient arrangement for determining the contrast value of a particular negative to be printed and a ready means for identifying the particular filter element adapted to produce a satisfactory grade or print therefrom.

Figure 4 is a plan view of one portion of the filter band or web;

Figure 5 is a plan view of the remaining portion of said web; and

Figure 6 is a chart illustrating the relationship of individual filter values to the contrast grade of the photographic print obtainable therewith.

Figure 1:
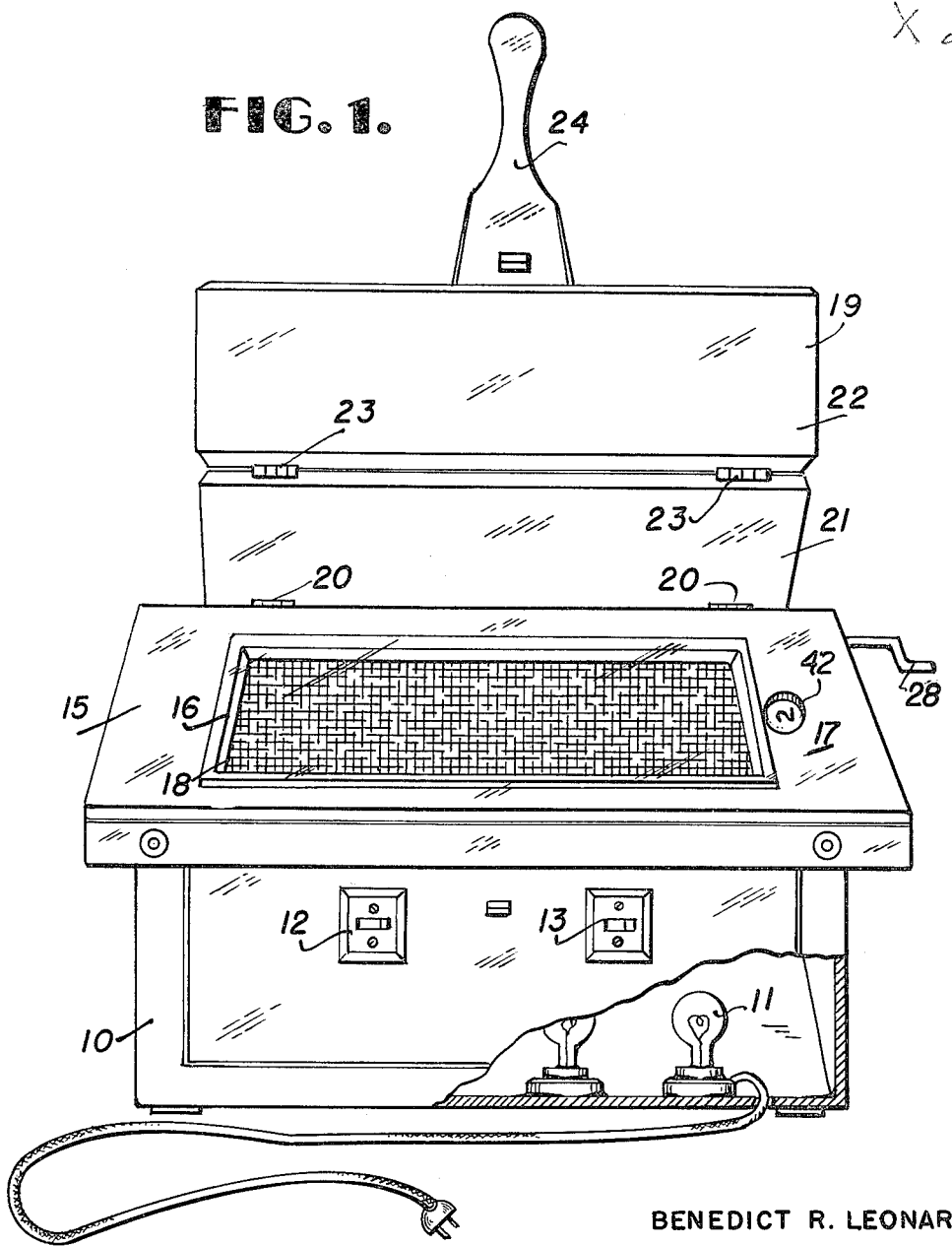
Figure 1 is a front view of the device comprising the present invention.

As shown in Figure 1, the device comprises a casing designated generally by the numeral 10. Said casing comprises an enclosure within which lamps 11 are located and provide a source of illumination for the production of prints upon suitable sensitized photographic printing paper. The lamps are connected in conventional circuits employed in photographic contact printing devices; the illuminating action of said lamps being controlled by means of switch 12.

An additional switch 13 is provided for the control of a safelight 14 which is also located within the casing and is intended to be used to provide sufficient safe illumination for adjusting the device and positioning the negative. The safelight also provides light for adjusting and positioning the printing paper without fogging the sensitized surface thereof. The top portion of casing 10 comprises a printing frame 15.

Printing frame portion 15 is provided with a suitable aperture 16 in the top wall 17 thereof, said aperture being covered by plate 18 of transparent material such as glass and which acts as a supporting surface for a photographic negative and sensitized paper during the printing operation. The printing frame portion 15 of the casing also carries a clamping cover plate 19 which is hingedly secured thereto by means of hinges 20. Said clamping cover plate may be of conventional design and formed of sections 21, 22 hingedly secured to each other as shown at 23, the entire assembly being capable of being brought into clamping relation with transparent plate 18 by the operation of clamping handle 24. The operation of the device is conventional to this point in that it is adapted to receive a transparent photographic negative on transparent plate 18, which negative is then covered by a sheet of sensitized paper and said negative and paper are then clamped in contact with each other by means of clamping cover 19. The illumination of lamps 11 by the operation of switch 12 exposes the sensitized paper to the light transmitted through said transparent negative for the desired length of time to produce a photographic print thereof. The casing is provided with a pair of brackets which slideably support a translucent screen or panel of opal or ground glass 44 which may be slid from the casing through an aperture provided in the end wall thereof. The use of such panel permits the degree of illumination striking the exposure aperture to be varied in accordance with the requirements of the particular printing paper being employed.

Figure 2:
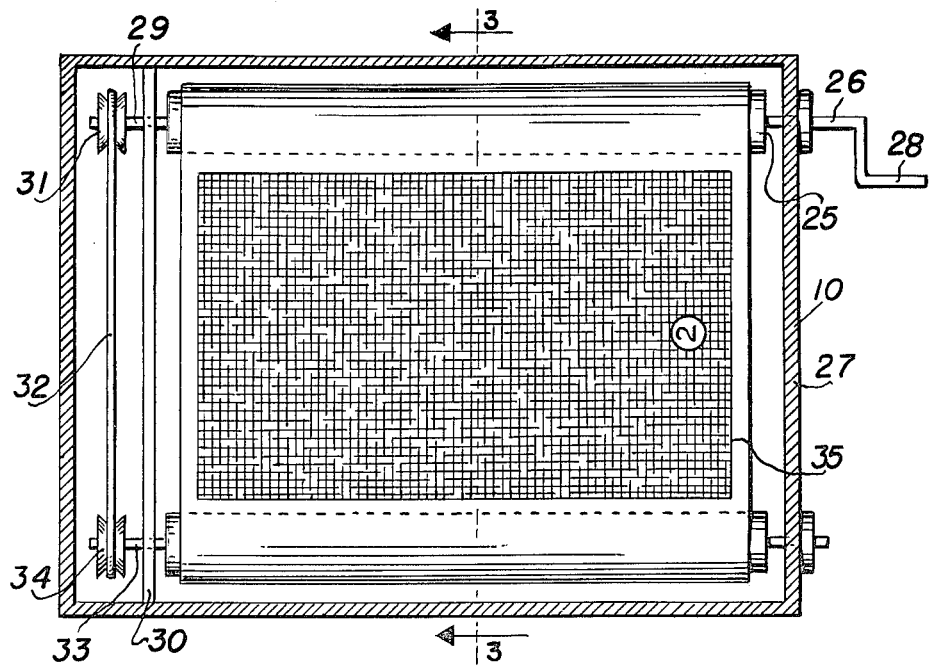
Figure 2 is a horizontal section thereof.
Figure 3:
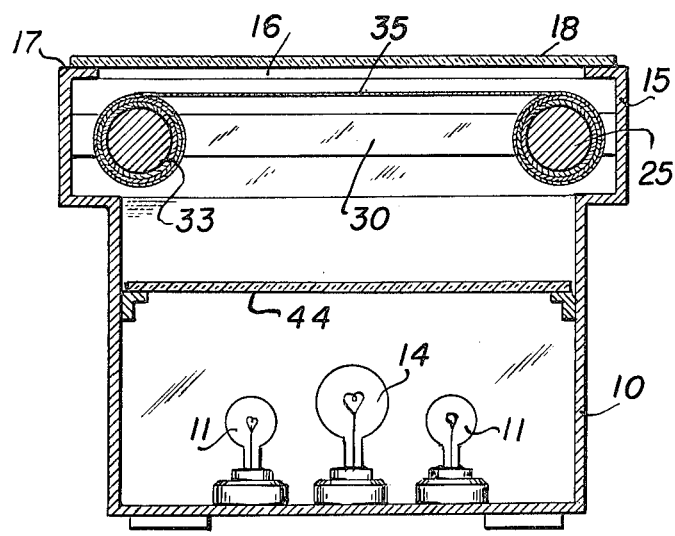
Figure 3 is a cross-section of said device taken along line 3—3 of Figure 2.

As shown in Figure 2, printing frame 15 of casing 10 is provided with a spool 25 extending in parallel spaced relation to one of the side walls thereof. One end of spool 25 is provided with a reduced end portion 26 which is journaled in side wall 27 of said casing and carries hand crank 28 which extends externally of said casing. The other reduced end 29 of spool 25 is journaled in supporting bar 30 which extends across frame 15 and is secured to the walls thereof. Reduced end 29 terminates in a pulley 31 which is provided with a circumferential groove for the purpose of guiding belt 32 as will more clearly appear hereafter. A complementary spool 33 is similarly rotatably carried at the other side of said printing frame portion 15 and has fixedly secured thereto pulley 34 similar to pulley 31. The pulleys 31 and 34 are connected to each other by means of belt 32. Belt 32 is preferably a continuous loop of helical or spiral spring construction forming a slightly resilient connection between the pulleys and thus preventing the said belt from becoming slack. It will be evident that upon the operation of hand crank 28, shaft 25 is rotated causing shaft 33 to be rotated in a similar direction by means of the belt connection between the shafts.

The ends of a flexible web or band of filter material 35, as will be more fully described hereafter, are secured to said spools and the band or web 35 is then wound on said spools 25 and 33 so that a portion thereof extends across the entire effective area of exposure aperture 16. It will be evident that the operation of the hand crank will therefore cause web 35 to be transported from one spool on to the other and thus expose any selected panel portion thereof across said aperture. The use of a spring type belt causes said web to be held in taut condition in spite of the variation in the amount of material wound on either of the spools. It will also be obvious that by reason of this construction the light emanating from lamps 11 must pass through the exposed portion of filter web 35 in order to reach the sensitized surface of the photographic printing paper. Any portion or filter panel of the web may thus be selected for interposition between the light source and the printing surface by the mere operation of the hand crank. By positioning spools 25 and 33 parallel with the longer dimension of frame 15, the number of revolutions of hand crank 28 required to effect a change in the portion of the web exposed between the shafts is reduced to a minimum.

The arrangement of filter web or band 35 is illustrated in detail in Figures 4 and 5. As shown in said figures said web 35 is provided with reinforced end portions 36 which may be provided with aperture 37 to permit said ends to be suitably secured to spools 25 and 33. The flexible web is comprised of a plurality of filter elements or panels 38. In the illustrated embodiment of the invention the web is formed of a plurality of independent panel elements cemented to each other at their meeting edges. Each of said panel elements is formed of a flexible sheet of filter material having the desired color transmission characteristics.

It will be understood however that other suitable filter web arrangements may be utilized; thus the independent panels may be mounted between bands of flexible sheets of color material if desired.

As shown in Figure 4 the filter web is arranged with a clear panel 39 at one end for the purpose of permitting the printing of photographs when it is desired to use the full illumination in non-modified form. Adjacent said initial clear panel is panel 40 permitting maximum transmission of yellow light for use in making low contrast or soft prints. The amount of yellow transmission is gradually decreased and simultaneously blue transmission is initiated and progressively increased until at panel 41, substantially all transmission is in the blue region only. Thus the web is formed of a plurality of filter panels which range from maximum yellow transmission to mixtures of blue and yellow in which the amount of yellow is progressively reduced and the amount of blue is increased until the sole transmission is in the blue region. The lining of the panels is intended to indicate this filter characteristic of the panels wherein prints ranging from low to high contrast may be produced. The relationship of filter values to the contrast of the print produced thereby with a commercially available variable contrast printing paper such as Varigam is illustrated by the chart of Figure 6. The chart tabulates a group of commercially available filters suitable for use with said printing papers and the numerical grade of contrast in the print resulting from their use. Thus the "1F" or yellow filter will produce soft or "0" contrast prints while the "10" filter produces a high or "4" contrast print. The filter web is thus advantageously formed of a group of filters having the values numerically indicated in the chart and is thus adapted to produce prints ranging from low to high in contrast grade with the use of a single grade of variable contrast printing paper. The grade of print produced by the particular filter panel is indicated by the numbers marked thereon adjacent one of the side edges of the web, as shown at 43. Said indicia or contrast grade numbers are adapted to register with an aperture provided in top wall 15 of printing frame 16 as shown in Figure 1. The light from the safelight 14 within the casing serves to constantly illuminate said aperture so that the contrast grade of print produced by the particular filter panel in printing position may be readily identified by the user. Although a particular number and graduation of filter elements has been illustrated, it will be understood that it is not intended to limit the practice of this invenion to the particular group of filters indicated.

I have here shown and described, a preferred embodiment of my invention. It will be apparent, however, that this invention is not limited to this embodiment, and that many changes, additions and modifications can be made in connection therewith without departing from the spirit and scope of the invention as herein disclosed and hereinafter claimed.

Having described my invention, what I claim as new and desire to secure by Letters Patent is:

A filter for photographic printers comprising a casing, a source of printing illumination and a safelight within said casing, a printing frame supported by said casing, said printing frame being provided with an exposure aperture, a pair of spools positioned at the sides of said aperture, a band of filter material having a series of areas of varying filter characteristics supported on said spools underneath said printing frame whereby one of said filter areas is exposed in operative position across said exposure aperture, an endless spring belt connecting said spools for simultaneous rotation thereof, whereby the rotation of said spools effects a change of the exposed filter area, indicia carried by each of said areas indicating the filter characteristics thereof whereby the characteristics of the filter area in operative position may be identified by means of the light of said safelight transmitted therethrough.

References Cited in the file of this patent

UNITED STATES PATENTS

| | | |
|---|---|---|
| 1,527,285 | Thalhammer | Feb. 24, 1925 |
| 1,598,956 | Capstaff | Sept. 7, 1926 |
| 1,689,258 | Seymour | Oct. 30, 1928 |
| 2,346,988 | Noel | Apr. 18, 1944 |
| 2,392,502 | Potter | Jan. 8, 1946 |
| 2,518,571 | Reeves | Aug. 15, 1950 |
| 2,557,182 | Forgett | June 19, 1951 |
| 2,566,264 | Tuttle et al. | Aug. 28, 1951 |